(12) United States Patent
Ge et al.

(10) Patent No.: US 12,472,831 B2
(45) Date of Patent: Nov. 18, 2025

(54) VEHICULAR ELECTRIC DRIVE SYSTEM INCLUDING TRACTION BATTERY, INVERTER, AND MOTOR HAVING SELF-HEATER ARRANGEMENT

(71) Applicant: Ford Global Technologies, LLC, Dearborn, MI (US)

(72) Inventors: Baoming Ge, Okemos, MI (US); Petros G. Taskas, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 338 days.

(21) Appl. No.: 18/333,741

(22) Filed: Jun. 13, 2023

(65) Prior Publication Data

US 2024/0416763 A1    Dec. 19, 2024

(51) Int. Cl.
*B60L 50/51*  (2019.01)
*B60L 58/26*  (2019.01)
*H02M 7/5387*  (2007.01)

(52) U.S. Cl.
CPC .............. *B60L 50/51* (2019.02); *B60L 58/26* (2019.02); *H02M 7/53873* (2013.01); *B60L 2210/42* (2013.01); *B60L 2240/425* (2013.01)

(58) Field of Classification Search
CPC ...... B60L 50/51; B60L 58/26; B60L 2210/42; B60L 2240/425; H02M 7/53873
USPC ....................................................... 180/65.1
See application file for complete search history.

(56) References Cited

U.S. PATENT DOCUMENTS

| | | | |
|---|---|---|---|
| 3,950,691 A * | 4/1976 | Ohba ................ | H02M 7/53806 361/91.6 |
| 5,414,339 A | 5/1995 | Masaki et al. | |
| 6,737,756 B1 * | 5/2004 | Gale ....................... | B60L 58/21 307/45 |
| 8,916,993 B2 * | 12/2014 | Berry ..................... | B60L 50/66 307/77 |
| 8,928,259 B2 * | 1/2015 | Kanakasabai ........... | B60L 58/20 180/65.21 |
| 9,441,725 B2 * | 9/2016 | Dobbins ............... | B60W 20/00 |
| 10,369,900 B1 | 8/2019 | Conlon | |
| 10,581,363 B2 * | 3/2020 | Ge ........................... | H02P 5/74 |
| 10,757,843 B2 | 8/2020 | Chen et al. | |
| 11,607,968 B1 * | 3/2023 | Ge ........................... | B60L 1/00 |

(Continued)

OTHER PUBLICATIONS

Final Office Action for U.S. Appl. No. 18/358,096, mailed Jul. 7, 2025, 27 pages.

*Primary Examiner* — Hau V Phan
(74) *Attorney, Agent, or Firm* — David B. Kelley; Brooks Kushman P.C.

(57) ABSTRACT

A system for an electrified vehicle, such as a battery electric vehicle (BEV), includes an inverter configured to drive a motor having motor windings with electrical power from a battery according to a configuration of a power switch of the inverter. The system further includes a capacitor connected between a center-tap of the battery and a neutral-point of the motor winding whereby the capacitor and the motor windings form an LC circuit. The system further includes a controller configured to operate the power switch in a zero-current-switching mode with a switching frequency dependent on a resonant frequency of the LC circuit to thereby cause electrical current to circulate between the battery, the inverter, and the motor which heats the battery and the motor windings.

12 Claims, 5 Drawing Sheets

(56) References Cited

U.S. PATENT DOCUMENTS

| | | | |
|---|---|---|---|
| 2009/0168461 A1* | 7/2009 | Nakahori | H02M 3/3378 |
| | | | 363/17 |
| 2010/0100266 A1 | 4/2010 | Yoshinori et al. | |
| 2011/0163717 A1* | 7/2011 | Gale | B60L 53/14 |
| | | | 320/109 |
| 2011/0168462 A1* | 7/2011 | Stanek | B60L 53/14 |
| | | | 320/109 |
| 2016/0221462 A1 | 8/2016 | Ripoll et al. | |
| 2019/0111786 A1* | 4/2019 | Qian | B60L 3/0069 |
| 2019/0184837 A1* | 6/2019 | Najmabadi | H02P 27/06 |
| 2019/0202300 A1* | 7/2019 | Pastor | H02J 7/04 |
| 2021/0043990 A1 | 2/2021 | Dan et al. | |
| 2021/0218085 A1 | 7/2021 | Ge et al. | |
| 2022/0041031 A1 | 2/2022 | Huang et al. | |
| 2022/0126701 A1* | 4/2022 | Gagas | B60L 53/24 |
| 2022/0161673 A1* | 5/2022 | Jimenez Pino | H02M 1/4208 |
| 2022/0223937 A1 | 7/2022 | Xu et al. | |
| 2024/0375547 A1 | 11/2024 | Lian et al. | |

* cited by examiner

VEHICULAR ELECTRIC DRIVE SYSTEM INCLUDING TRACTION BATTERY, INVERTER, AND MOTOR HAVING SELF-HEATER ARRANGEMENT

TECHNICAL FIELD

The present disclosure relates to utilizing a traction battery, an inverter, and windings of a motor of an electric drive system of an electrified vehicle to heat the traction battery and transmission fluid of the motor.

BACKGROUND

An electrified vehicle includes an electric drive system having a traction battery, an inverter, and a motor. The motor is powered with electrical energy from the traction battery via the inverter to propel the electrified vehicle.

SUMMARY

A system having an inverter, a capacitor, and a controller is provided. The inverter is configured to drive a motor having a winding with electrical power from a battery according to a configuration of a first power switch of the inverter. The capacitor is connected between a center-tap of the battery and a neutral-point of the winding. The controller is configured to operate the first power switch in a zero-current-switching (ZCS) mode to thereby achieve a target temperature of the battery and the winding.

The capacitor and the winding form an LC circuit. The controller may be configured to operate the first power switch in the ZCS mode by operating the first power switch at a switching frequency dependent on a resonant frequency of the LC circuit.

The switching frequency may be dependent on the resonant frequency of the LC circuit according to the equation:

$$fsw = fresonant/(2*k)$$

where $f_{sw}$ is the switching frequency, $f_{resonant}$ is the resonant frequency of the LC circuit, and k is a positive integer.

The inverter may be further configured to drive the motor with electrical power from the battery according to a configuration of a second power switch of the inverter. In this case, the controller may be further configured to operate the first power switch and the second power in the ZCS mode by alternately switching one of the power switches ON while switching the other one of the power switches OFF.

The controller in alternately switching the power switches ON and OFF may alternately switch the power switches ON and OFF with a duty cycle of 50%.

The system may further include a contactor connected in series with the capacitor between the center-tap of the battery and the neutral-point of the winding. The contactor is movable between a first position in which electrical continuity between the center-tap of the battery and the neutral-point of the winding via the capacitor is established and a second position in which electrical discontinuity between the center-tap of the battery and the neutral-point of the winding is established.

The controller may be further configured to move the contactor to the first position while the target temperature of the battery and the winding is not achieved.

A method for use with an electric drive system (EDS) of a vehicle is provided. The EDS includes a traction battery, a motor having motor windings, and an inverter configured to drive the motor with electrical power from the traction battery according to a configuration of an upper power switch and a lower power switch in a leg of the inverter. The method includes connecting a center-tap of the traction battery and a neutral-point of the motor windings together with a capacitor whereby the capacitor and the motor windings form an LC circuit. The method further includes alternately switching one of the power switches ON while switching the other one of the power switches OFF at a switching frequency dependent on a resonant frequency of the LC circuit to thereby cause electrical current to circulate between the traction battery, the inverter, and the motor which heats the traction battery and the motor windings.

Connecting the center-tap of the traction battery and the neutral-point of the motor windings together with the capacitor may be performed only while the vehicle is not being propelled by the motor and a target temperature of the traction battery and the motor windings is not achieved.

The method may further include (i) disconnecting the center-tap of the traction battery and the neutral-point of the motor windings from one another while the vehicle is to be propelled by the motor and (ii) operating the power switches for the inverter to drive the motor with electrical power from the traction battery for the motor to propel the vehicle.

An EDS for a vehicle is provided. The EDS includes a traction battery, a motor having motor windings, an inverter configured to drive the motor with electrical power from the traction battery according to a configuration of an upper power switch and a lower power switch in a leg of the inverter, and a capacitor connecting a center-tap of the traction battery and a neutral-point of the motor windings together whereby the capacitor and the motor windings form an LC circuit. The EDS further includes a controller configured to alternately switch one of the power switches ON while switching the other one of the power switches OFF at a switching frequency dependent on a resonant frequency of the LC circuit to thereby cause electrical current to circulate between the traction battery, the inverter, and the motor which heats the traction battery and the motor windings.

The EDS may further include a contactor connected in series with the capacitor between the center-tap of the traction battery and the neutral-point of the motor windings. The contactor is movable between a first position in which electrical continuity between the center-tap of the traction battery and the neutral-point of the motor windings via the capacitor is established and a second position in which electrical discontinuity between the center-tap of the traction battery and the neutral-point of the motor windings is established.

The controller may be further configured to move the contactor to the first position while the vehicle is not being propelled by the motor and a target temperature of the traction battery and the motor windings is not achieved.

The controller may be further configured to move the contactor to the second position while the vehicle is to be propelled by the motor and to operate the power switches for the inverter to drive the motor with electrical power from the traction battery for the motor to propel the vehicle.

The traction battery may include a first battery pack and a second battery pack with a cathode of the first battery pack and an anode of the second battery pack being connected together at the center-tap of the traction battery.

DETAILED DESCRIPTION

Detailed embodiments of the present disclosure are disclosed herein; however, it is to be understood that the disclosed embodiments are merely exemplary of the present disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
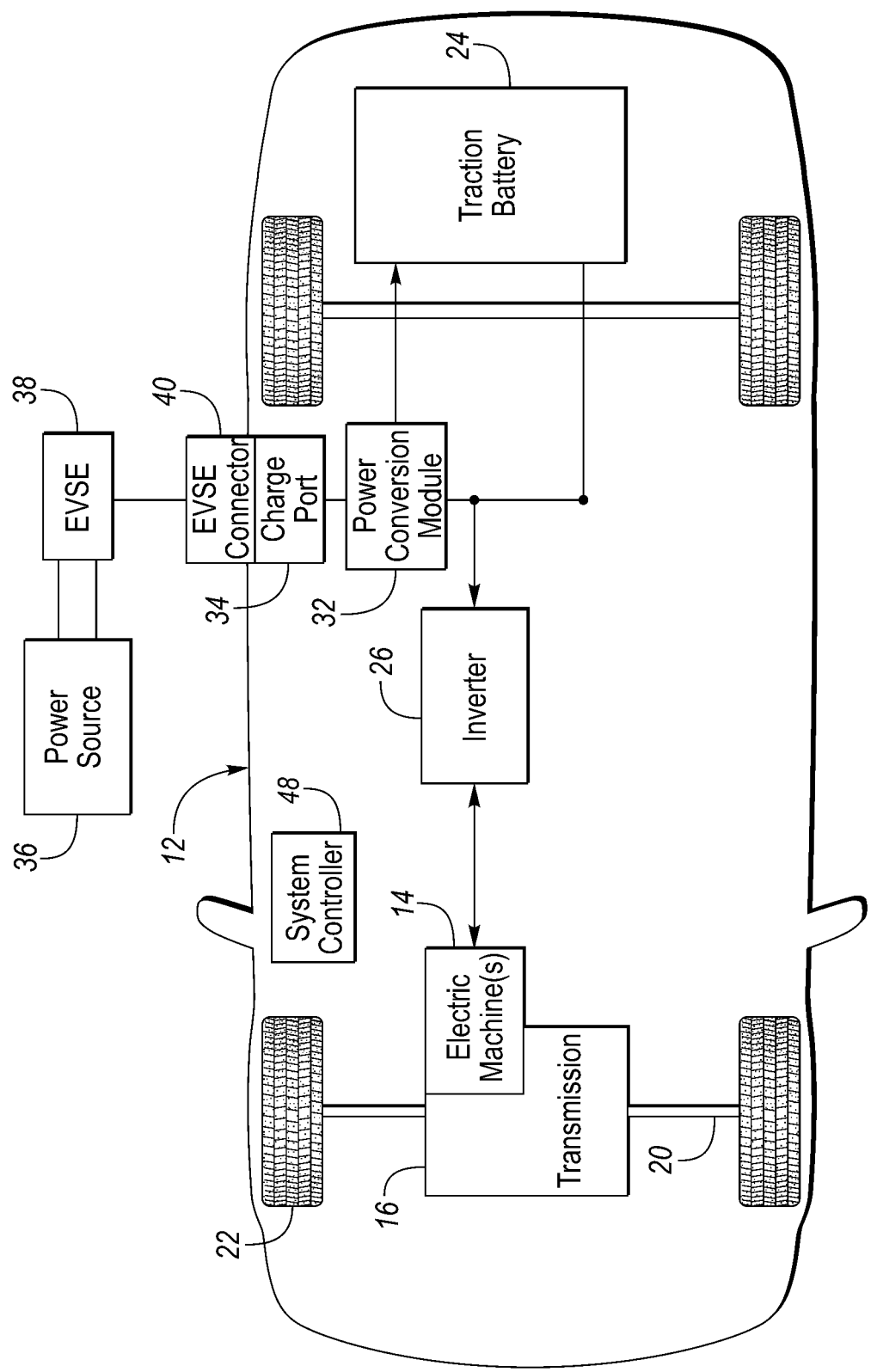
FIG. 1 illustrates a block diagram of a battery electric vehicle (BEV) having an electric drive system including a traction battery, an inverter, and a motor.

Referring now to FIG. 1, a block diagram of an electrified vehicle 12 in the form of a battery electric vehicle (BEV) is shown. BEV 12 has an electric drive system (EDS) including one or more motors ("electric machine(s)") 14, a traction battery ("battery" or "battery pack") 24, and a power electronics module in the form of an inverter 26 (or inverter system controller (ISC)). In the BEV configuration, traction battery 24 provides all of the propulsion power with the electrified vehicle not having an engine. In other variations, the electrified vehicle may be a plug-in (or non-plug-in) hybrid electric vehicle (HEV) further having an engine.

Motor 14 is part of the EDS of BEV 12 for powering movement of the BEV. In this regard, motor 14 is mechanically connected to a transmission 16 of BEV 12. Transmission 16 is mechanically connected to a drive shaft 20 that is mechanically connected to wheels 22 of BEV 12. Motor 14 can provide propulsion capability to BEV 12 and is capable of operating as a generator. Motor 14 acting as a generator can recover energy that may normally be lost as heat in a friction braking system of BEV 12.

Traction battery 24 stores electrical energy that can be used by motor 14 for propelling BEV 12. Traction battery 24 typically provides a high-voltage (HV) direct current (DC) output. Traction battery 24 is electrically connected to inverter 26. Motor 14 is also electrically connected to inverter 26. Inverter 26 provides the ability to bi-directionally transfer energy between traction battery 24 and motor 14. For example, traction battery 24 may provide a DC voltage while motor 14 may require a three-phase alternating current (AC) current to function. Inverter 26 may convert the DC voltage to a three-phase AC current to operate motor 14. In a regenerative mode, inverter 26 may convert three-phase AC current from motor 14 acting as a generator to DC voltage compatible with traction battery 24.

Traction battery 24 is rechargeable by an external power source 36 (e.g., the grid). External power source 36 may be electrically connected to electric vehicle supply equipment (EVSE) 38. EVSE 38 provides circuitry and controls to control and manage the transfer of electrical energy between external power source 36 and BEV 12. External power source 36 may provide DC or AC electric power to EVSE 38. EVSE 38 may have a charge connector 40 for plugging into a charge port 34 of BEV 12.

A power conversion module 32 of BEV 12, such as an on-board charger having a DC/DC converter, may condition power supplied from EVSE 38 to provide the proper voltage and current levels to traction battery 24. Power conversion module 32 may interface with EVSE 38 to coordinate the delivery of power to traction battery 24.

The various components described above may have one or more associated controllers to control and monitor the operation of the components. The controllers can be microprocessor-based devices. The controllers may communicate via a serial bus (e.g., Controller Area Network (CAN)) or via discrete conductors.

For example, a system controller 48 ("vehicle controller") is present to coordinate the operation of the various components. Controller 48 includes electronics, software, or both, to perform the necessary control functions for operating BEV 12. Controller 48 may be a combination vehicle system controller and powertrain control module (VSC/PCM). Although controller 48 is shown as a single device, controller 48 may include multiple controllers in the form of multiple hardware devices, or multiple software controllers with one or more hardware devices. In this regard, a reference to a "controller" herein may refer to one or more controllers.

Traction battery 24 may have one or more temperature sensors such as thermistors in communication with controller 48 to provide data indicative of the temperature of the traction battery for the controller to monitor the temperature of the traction battery. BEV 12 may further include a temperature sensor to provide data indicative of ambient temperature for controller 48 to monitor the ambient temperature.

Figure 2:
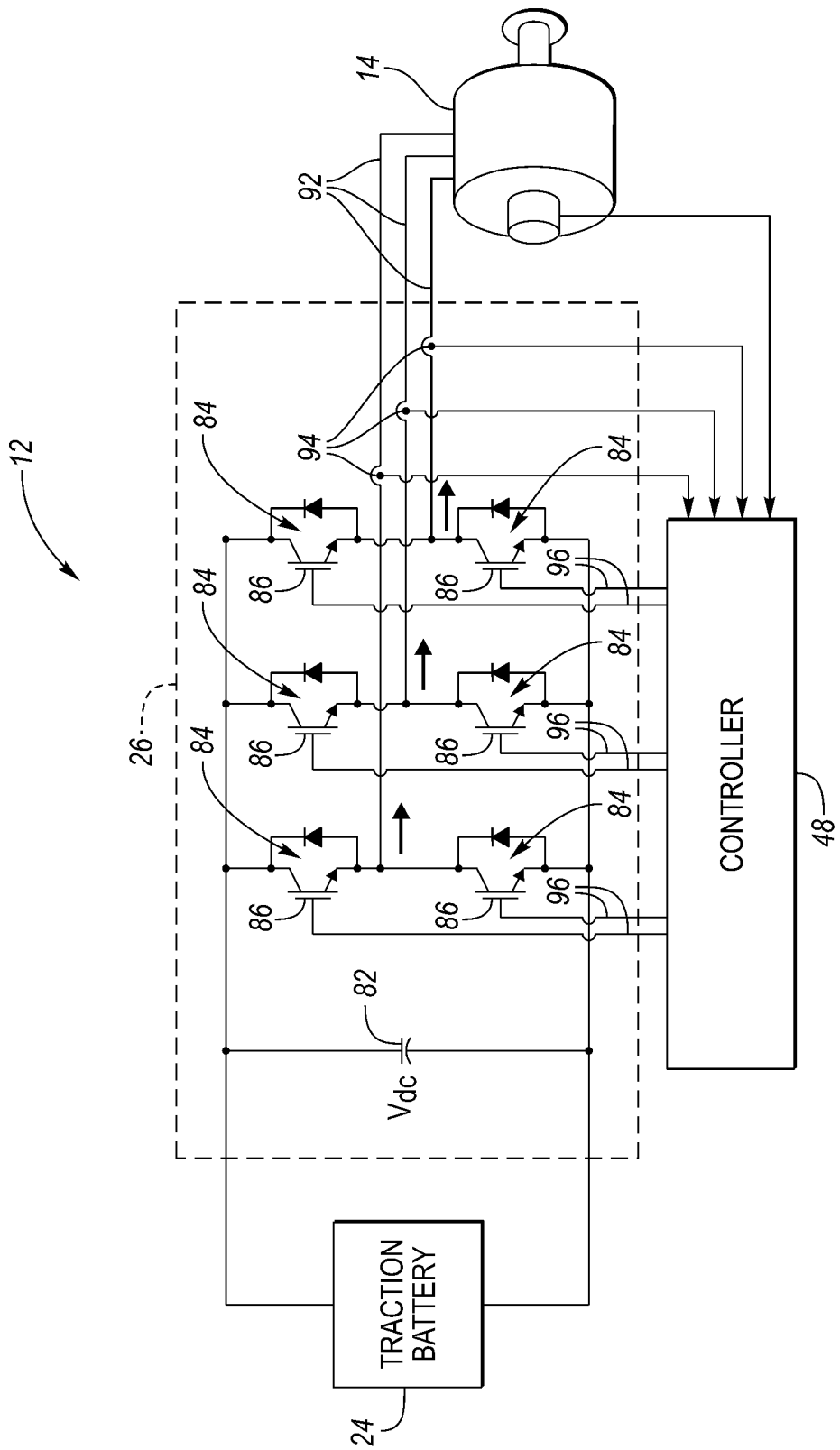
FIG. 2 illustrates a functional diagram of the traction battery, the inverter, and the motor of the electric drive system.

Referring now to FIG. 2, with continual reference to FIG. 1, a functional diagram of traction battery 24, inverter 26, and motor 14 of the EDS is shown. As noted above, inverter 26 is coupled between traction battery 24 and motor 14. Inverter 26 converts DC electrical power provided from traction battery 24 into AC electrical power for providing to motor 14. In this way, inverter 26 drives motor 14 with power from traction battery 24 for the motor to propel BEV

12. A DC-link capacitor ($V_{dc}$) 82 is connected in parallel with traction battery 24 and is disposed between the traction battery and inverter 26.

Controller 48 is operable to control inverter 26 for the inverter to move electrical power from traction battery 24 for driving (i.e., motoring) motor 14. Particularly, controller 48 controls power switches 86 of inverter 26 to open and close (e.g., switch on-and-off) pursuant to selected switching frequencies and selected duty cycles for the inverter to move electrical power from traction battery 24 to motor 14.

Inverter 26 includes three sets of pairs of power switching units 84 (i.e., three×two=a total of six power switching units 84 as shown in FIG. 2). Each set of power switching units 84 includes two power switches 86 connected at a common bridge node (i.e., an upper power switch and a lower power switch in each of three legs or "phases" of inverter 26). In this example, each power switch 86 is a transistor in the form of an insulated gate bipolar transistor (IGBT).

Each set pair of power switching units 84 is connected in parallel to traction battery 24 and thereby each set pair of power switching units forms a phase of inverter 26. Power switches 86 of each of the three phases are electrically connected via power conductors 92 to respective ones of three windings of motor 14. Current sensors 94 may be disposed to monitor electrical current in power conductors 92. In this way, inverter 26, having three set pairs of power switching units 84, is a three-phase inverter operable for converting DC electrical power from traction battery 24 into three-phase AC electrical power for providing to motor 14.

As indicated, controller 48 is operable to control the on-and-off switching operation of power switches 86 to cause inverter 26 to convert a given DC electrical power provided from traction battery 24 into a desired AC electrical power for providing to motor 14. In operation, controller 48 receives motor control commands and controls states of inverter 26 to provide motor drive functionalities. Controller 48 monitors signal inputs from position sensors associated with motor 14 and from current sensors 94. Controller 48 communicates control signals via control lines 96 to individual ones of power switches 86. Controller 48 includes control circuits, algorithms, and other control elements to generate the control signals. Power switches 86 control the phase currents (i.e., ia, ib and ic), which are transferred via power conductors 92 to the motor windings for motor 14 to generate power in the form of torque and/or rotational speed based upon the motor position and/or the motor speed.

In controlling inverter 26 to drive motor 14 with the desired AC electrical power, controller 48 controls the operation of power switches 86 according to pulse-width-modulated (PWM) control strategies. In this regard, controller 48 generates a PWM control signal having a selected carrier switching frequency and a selected duty cycle. Power switches 86 in response to PWM control signals switch on-and-off according to the switching frequency and the duty cycle of the PWM control signals. In this way, power switches 86 are driven at a particular switching frequency and within each cycle of the switching frequency the power switches may be operated at a specified duty cycle. Motor 14 is correspondingly driven pursuant to the operation of power switches 86 such as to thereby propel BEV 12.

The performance of traction battery 24, such as in the form of a lithium-ion traction battery, is generally best when the traction battery is not cold. Therefore, maintaining the temperature of traction battery 24 greater than a cold temperature threshold is desired. Particularly, being able to heat traction battery 24 when the traction battery is cold so that the traction battery is no longer cold is desired.

Likewise, the performance of motor 14 is generally best when transmission fluid of motor 14 is not cold. Therefore, maintaining the temperature of the transmission fluid of motor 14 greater than a cold temperature threshold is desired. Particularly, being able to heat the motor transmission fluid when the motor transmission fluid is cold so that the motor transmission fluid is no longer cold is desired.

Typically, electrified vehicles further include a thermal arrangement having a heating loop comprised of conduits, pumps, and the ability to circulate heating fluid (i.e., coolant) to the traction battery for heating the traction battery. The thermal arrangement further includes a coolant heater to warm the coolant being circulated to the traction battery. The coolant heater is ordinarily an electric-resistance heater such as a positive temperature coefficient (PTC) heater. An issue is that such an electric-resistance heater requires a relatively large amount of electrical power for its operation. The electrical power is provided either by the traction battery, which thereby reduces vehicle range, or by an external power source, such as when the traction battery is being recharged. In operation, the thermal arrangement first converts electrical energy to mechanical heat (using the coolant heater) and during this process some energy will be lost. Then the mechanical heat from the coolant goes to heat the traction battery and during this process some energy will be lost again. This makes the thermal arrangement relatively inefficient. Further, the thermal arrangement as described does not accommodate for heating the transmission fluid of the motor.

In accordance with the present disclosure, traction battery 24, inverter 26, and motor 14 of the EDS have a self-heater arrangement for heating the traction battery and the transmission fluid of the motor. The self-heater arrangement implements a relatively high-efficient and relatively economically-effective self-heater for traction battery 24 and the motor transmission fluid to overcome the issues with the thermal arrangement. That is, the self-heater arrangement implements a relatively high-efficient and relatively economically-effective heater using traction battery 24, inverter 26, and motor 14 (particularly, the windings of the motor).

Figure 3:
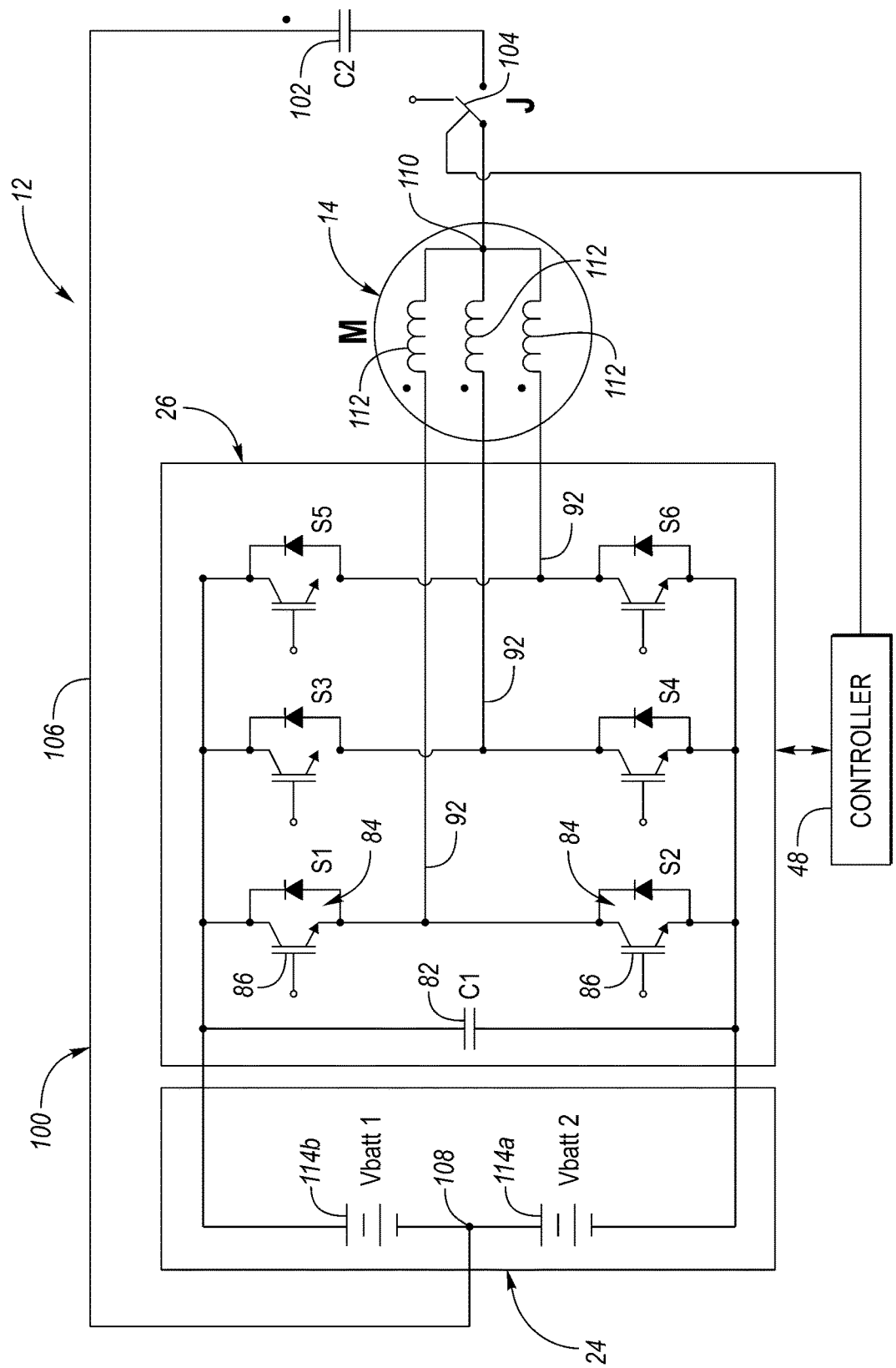
FIG. 3 illustrates a functional diagram of the traction battery, the inverter, and the motor of the electric drive system having a self-heater arrangement.

Referring now to FIG. 3, with continual reference to FIGS. 1 and 2, a functional diagram of traction battery 24, inverter 26, and motor 14 having the self-heater arrangement is shown. The self-heater arrangement includes a hardware circuit 100 and a control algorithm carried out by controller 48. The control algorithm generally involves controller 48 controlling hardware circuit 100 and inverter 26 to operate in a specific manner, as described in detail below.

The functional diagram of FIG. 3 shows the circuit topology including hardware circuit 100 of the self-heater arrangement. As shown in FIG. 3, hardware circuit 100 includes a capacitor (C2) 102, a contactor (J) 104, and a conductor 106. Capacitor 102 has a relatively small capacitance such as on the order of 10 μF. Conductor 106 is connected from a center tap 108 of traction battery 24 to a neutral point 110 of windings 112 of motor 14 through capacitor 102 and contactor 104. As such, when contactor 104 is closed, center tap 108 of traction battery 24 and neutral point 110 of motor windings 112 are connected with electrical continuity through capacitor 102. Controller 48 is operable to control contactor 104 to open and close.

Accordingly, when contactor 104 is closed, (i) traction battery 24 is connected to motor windings 112 via inverter 26 per the ordinary configuration shown in FIG. 2 and (ii) center tap 108 of traction battery 24 is connected to neutral point 110 of motor windings 112 via capacitor 102 per the configuration employing hardware circuit 100.

Conversely, when contactor 104 is opened, center tap 108 of traction battery 24 and neutral point 110 of motor windings 112 are disconnected with electrical discontinuity from one another. Accordingly, when contactor 104 is opened, hardware circuit 100 is effectively non-existent, and the EDS has the ordinary configuration shown in FIG. 2.

As noted, traction battery 24 includes center tap 108. Center tap 108 divides traction battery 24 into first and second serially-connected battery banks 114a and 114b. In this example, battery banks 114a and 114b are roughly identical battery banks having roughly the same voltage. For instance, traction battery 24 is an 800 V battery with battery banks 114a and 114b each being 400 V battery banks. In this case, the voltage at center tap 108 is 400 V, the cathode of second battery bank 114b and the anode of first battery bank 114a are tied to center tap 108 and are at the voltage of 400 V, the voltage at the anode of second battery bank 114b is 800 V, and the voltage at the cathode of first battery bank 114a is 0 V.

The self-heater arrangement utilizes inverter 26 and motor windings 112 to heat traction battery 24. This also heats the transmission fluid of motor 14.

The control algorithm of the self-heater arrangement implemented by controller 48 provides two operation modes. The first operation mode is an ordinary mode in which the EDS is used to propel BEV 12 as is ordinarily done. In the ordinary mode, controller 48 controls contactor 104 to be opened whereby hardware circuit 100 is effectively non-existent, and the EDS has the ordinary configuration shown in FIG. 2. The second operation mode is a heating mode in which the EDS is used to heat traction battery 24 and the transmission fluid of motor 14. In the heating mode, controller 48 controls contactor 104 to be closed whereby center tap 108 of traction battery 24 and neutral point 110 of motor windings 112 are connected through capacitor 102.

In the ordinary mode of the EDS, contactor 104 is opened. When BEV 12 is to be propelled by motor 14, inverter 26 drives the motor with power flow between traction battery 24 and the motor. Controller 48 controls the operation of power switches 86 of inverter 26 such as according to traditional PWM control strategies. Motor 14 is correspondingly driven pursuant to the operation of power switches 86 to thereby propel BEV 12.

In the heating mode of the EDS, contactor 104 is closed and BEV 12 is not being propelled by motor 14. Controller 48 closes contactor 104 when it is desired to heat traction battery 14 while BEV 12 is not being propelled by motor 14. With center tap 108 of traction battery 24 and neutral point 110 of motor windings 112 being connected via capacitor 102 when contactor 104 is closed, the motor windings act as coupled inductors (i.e., the three motor windings act as three coupled inductors) with the motor windings and the capacitor forming an LC circuit. Controller 48 operates inverter 26 in a zero-current-switching (ZCS) mode according to a selected control strategy based on a resonant frequency of the LC circuit. That is, controller 48 controls power switches 86 of inverter 26 according to the selected control strategy to operate the inverter in the ZCS mode.

More particularly, in the heating mode, controller 48 controls power switches 86 of inverter 26 according to the selected control strategy such that motor windings 112 and capacitor 102 are employed to achieve resonant operation. The resonant frequency ($f_{resonant}$) of the LC circuit formed by motor windings 112 and capacitor 102 is defined by the equation:

$$fresonant = 1/2\pi\sqrt{L1C2} \quad (1)$$

L1 is the inductance of motor windings 112 and C2 is the capacitance of capacitor 102.

Power switches 86 of inverter 26 operating according to the selected control strategy employed to achieve resonant operation causes a resonant current ($I_{batt}$) to flow through traction battery 24. The resonant current ($I_{batt}$) has an amplitude defined by the equation:

$$Ibatt = \sqrt{\frac{C2}{L1}} * Vbatt1 \quad (2)$$

$V_{batt1}$ is the voltage at center tap 108 of traction battery 24.

The resonant current circulates between traction battery 24, inverter 26 and motor 14 which generates heat throughout the EDS. In this way, traction battery 24 and transmission fluid of motor 14 are heated.

Figure 4:
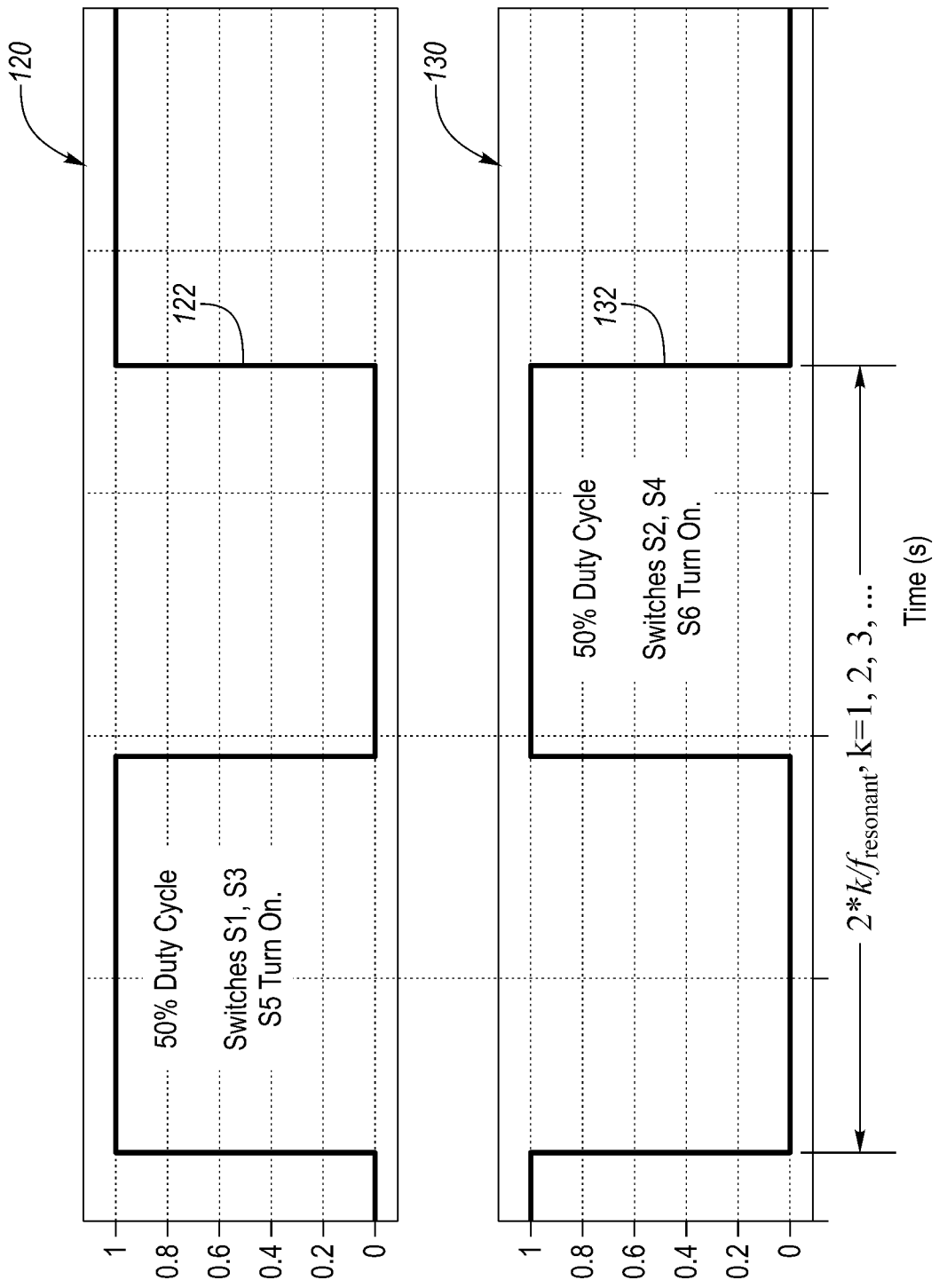
FIG. 4 illustrates a first graph having a plot of a control signal for implementing the on-and-off switching of a top bridge group of power switches of the inverter versus time during a heating mode of the self-heater arrangement and a second graph having a plot of a control signal for implementing the on-and-off switching of a bottom bridge group of power switches of the inverter versus time during the heating mode of the self-heater arrangement.

Referring now to FIG. 4, with continual reference to FIG. 3, the selected control strategy employed by controller 48 during the heating mode will be described in greater detail. Again, controller 48 employs the selected control strategy to control power switches 86 of inverter 26 for the inverter to operate in the ZCS mode.

FIG. 4 illustrates a first graph 120 having a plot 122 of a first control signal of controller 48 for implementing the on-and-off switching of a top bridge group of power switches 86 during the heating mode. With reference to FIG. 3, the top bridge group of power switches 86 of the three legs of inverter 26 shown therein are labeled as S1, S3, and S5. FIG. 4 further illustrates a second graph 130 having a plot 132 of a second control signal of controller 48 for implementing the on-and-off switching of a bottom bridge group of power switches 86 during the heating mode. With further reference to FIG. 3, the bottom bridge group of power switches 86 of the three legs of inverter 26 are labeled as S2, S4, and S6.

Graphs 120 and 130 are depictive of the control strategy employed by controller 48 for operating inverter 26 in zero current switching while center-tap 108 of traction battery 24 and neutral-point 110 of motor windings 112 are connected by capacitor 102 during the heating mode in order to heat up traction battery 24 and the transmission fluid of motor 14.

During the heating mode, per the selected control strategy, controller 48 operates each power switch 86 in the ZCS mode by operating the power switch at a switching frequency ($f_{sw}$) dependent on the resonant frequency of the LC circuit formed by motor windings 112 and capacitor 102. The switching frequency ($f_{sw}$) is dependent on the resonant frequency ($f_{resonant}$) of the LC circuit according to the equation:

$$fsw = fresonant/(2*k) \quad \text{where } k = 1, 2, 3, \ldots \quad (3)$$

Correspondingly, the period (T) of each cycle of a power switch 86 operating at the switching frequency ($f_{sw}$) is defined by the equation:

$$T = 2*k/fresonant \quad (4)$$

More particularly, per the selected control strategy, controller 48 (a) switches ON the top bridge group of power switches S1, S3, and S5 at the switching frequency ($f_{sw}$) with a duty cycle of 50% while switching OFF the bottom bridge group of power switches S2, S4, and S6 at the switching frequency ($f_{sw}$) with the duty cycle of 50% and (b) switches OFF the top bridge group of power switches S1, S3, and S5 at the switching frequency ($f_{sw}$) with the duty cycle of 50% while switching ON the bottom bridge group of power switches S2, S4, and S6 at the switching frequency ($f_{sw}$) with the duty cycle of 50%. Accordingly, power switches S1, S3, and S5 are switched ON while power switches S2, S4, and S6 are switched OFF; and power switches S1, S3, and S5 are switched OFF while power switches S2, S4, and S6 are switched ON.

Controller 48 switches ON and OFF power switches S1, S3, and S5 at the switching frequency ($f_{sw}$) with the duty cycle of 50% by issuing to these power switches the first control signal represented by plot 122 of graph 120 in FIG. 4. Correspondingly, controller 48 switches OFF and ON power switches S2, S4, and S6 at the switching frequency ($f_{sw}$) with the duty cycle of 50% by issuing to these power switches the second control signal represented by plot 132 of graph 130 in FIG. 4. In this way, the top bridge group of power switches S1, S3, and S5 and the bottom bridge group of power switches S2, S4, and S6 are alternately switched ON and OFF.

As noted, the top and bottom groups of power switches being alternately switched ON and OFF in this manner generates the resonant current ($I_{batt}$) which circulates between traction battery 24, inverter 26 and motor 14. This circulating resonant current ($I_{batt}$) generates heat throughout the EDS which heats traction battery 24 and transmission fluid of motor 14. In this way, a target temperature of traction battery 24 and motor windings 112 can be achieved.

As noted, the switching frequency ($f_{sw}$) is dependent on the resonant frequency ($f_{resonant}$) and a positive integer k. There is always no switching loss no matter the value of k. The circulating resonant current ($I_{batt}$) heats up first and second battery banks 114a and 114b with high frequency and will continuously heat up motor windings 112 that further heat up the transmission fluid of motor 14.

Figure 5:
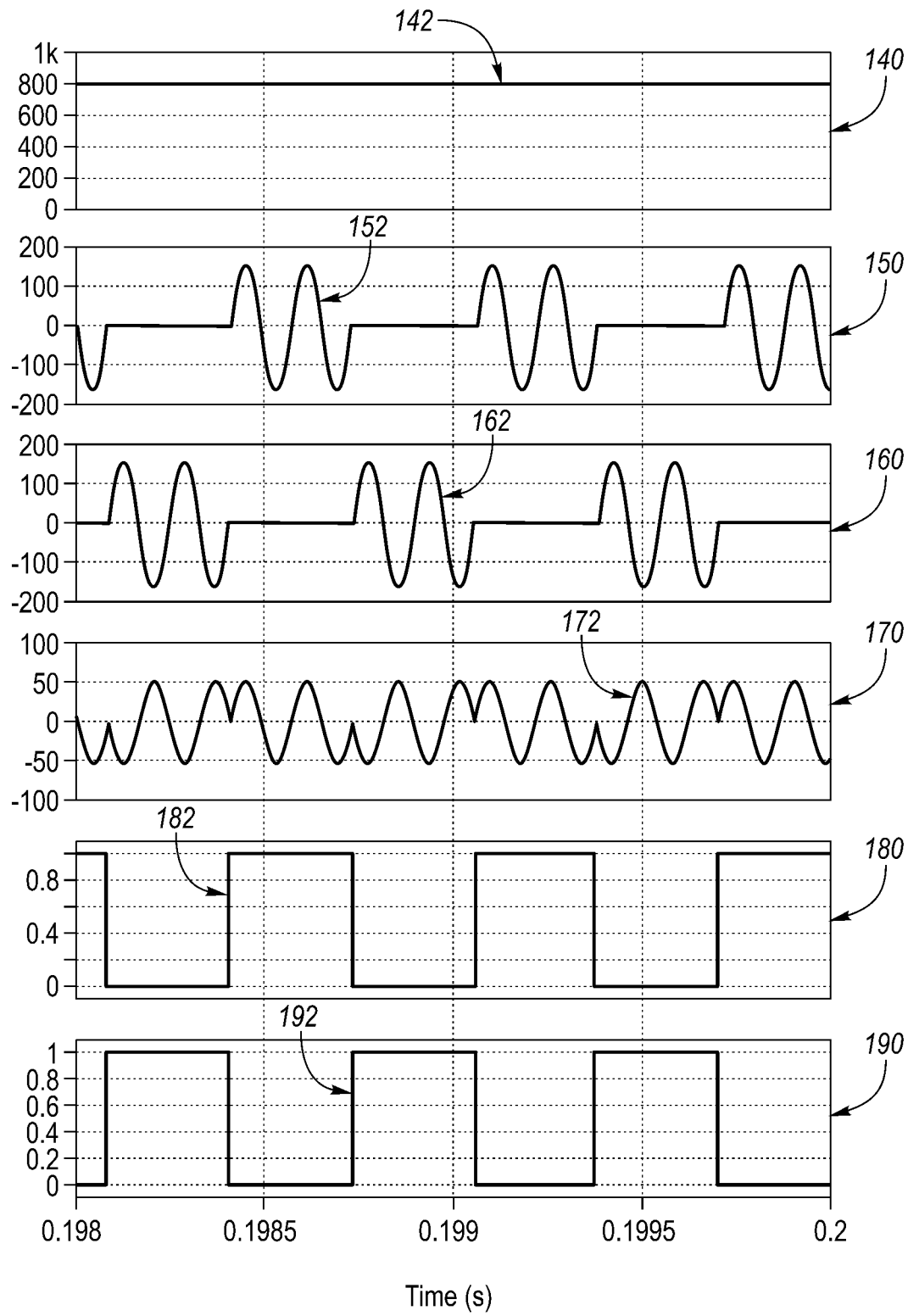
FIG. 5 illustrates graphs of simulation results of the self-heater arrangement during the heating mode, the graphs including a first graph having a plot of the voltage of the traction battery versus time, a second graph having a plot of the current of the first of two battery banks forming the traction battery versus time, a third graph having a plot of the current of the second of the two battery banks forming the traction battery versus time, a fourth graph having a plot of the current of one of the windings of the motor versus time, a fifth graph having a plot of a control signal for implementing the on-and-off switching of the top bridge group of power switches of the inverter versus time, and a sixth graph having a plot of a control signal for implementing the on-and-off switching of the bottom bridge group of power switches of the inverter versus time.

Simulation results of a demonstration of the self-heater arrangement of the EDS during the heating mode to heat up traction battery 24 and the transmission fluid of motor 14 will now be described with reference to FIG. 5. FIG. 5 illustrates graphs of the simulation results including a first graph 140 having a plot 142 of the voltage of traction battery 24 versus time, a second graph 150 having a plot 152 of the current of second battery bank 114b versus time, a third graph 160 having a plot 162 of the current of first battery bank 114a versus time, a fourth graph 170 having a plot 172 of the current of a motor winding 112 versus time, a fifth graph 180 having a plot 182 of a control signal for implementing the on-and-off switching of the top bridge group of power switches 86 versus time, and a sixth graph 190 having a plot 192 of a control signal for implementing the on-and-off switching of the bottom bridge group of power switches 86 versus time.

In this simulation, the voltage ($V_{batt}$) of traction battery 24 is 800 V, as confirmed by plot 142 of graph 140. The inductance of each of the three motor windings 112 is 200 μH and the capacitance of capacitor 102 is 10 μF. Consequently, the resonant frequency ($f_{resonant}$) is 6164 Hz. In this simulation, k=2. Consequently, the switching frequency ($f_{sw}$) is 1540 Hz.

As shown by plots 152 and 162 of graphs 150 and 160, respectively, second and first battery banks 114b and 114a alternately have two whole cycles of currents. As a result, second and first battery banks 114b and 114a are alternately heated with a frequency of 1540 Hz. All six power switches S1, S2, S3, S4, S5, and S6 perform ZCS so that there is no switching loss, as confirmed by graph 170. The traction battery current amplitude is 155 A in this simulation. The traction battery current amplitude can be designed to best fit traction battery characteristics by using capacitor 102 with an appropriate capacitance.

As described, the present disclosure provides an EDS for an electrified vehicle in which the EDS includes a traction battery, an inverter, and a motor having a self-heater arrangement. To implement the self-heater arrangement, the EDS further includes a hardware circuit having a capacitor, a contactor, and connection wires between the center-tap of the traction battery and the neutral-point of the motor windings through the capacitor and the contactor. The self-heater arrangement utilizes the inverter and the motor windings with only economically-effective components (i.e., the capacitor, the contactor, and the connection wires) being added. The self-heater arrangement achieves zero current switching, and the inverter has zero switching loss, which leads to high efficiency.

The self-heater arrangement makes the ambient temperature irrelevant to operation of the electrified vehicle. In this regard, the traction battery temperature and the coolant temperature are automatically controlled to maintain them within a desired range. As a result, traction battery and motor transmission fluid achieve the best performance no matter the ambient temperature. This eliminates the need to use a separate coolant heater as outlined above.

The switching frequency ($f_{sw}$) is only $$\frac{1}{2*k}$$

of the resonant frequency $f_{resonant}$, where k is a positive integer. This lowers the requirement of power switches when implementing resonant operation. Moreover, the resonant frequency can be quite high even with a quite low switching frequency, as a result the passive components size is quite small.

While exemplary embodiments are described above, it is not intended that these embodiments describe all possible forms of the present disclosure. Rather, the words used in the specification are words of description rather than limitation, and it is understood that various changes may be made without departing from the spirit and scope of the present disclosure. Additionally, the features of various implementing embodiments may be combined to form further embodiments of the present disclosure.

What is claimed is:

1. A system comprising:
   an inverter configured to drive a motor having a winding with electrical power from a battery, the electrical power being according to a configuration of a first power switch of the inverter;
   a capacitor connected between a center-tap of the battery and a neutral-point of the winding;
   a contactor connected in series with the capacitor between the center-tap of the battery and the neutral-point of the winding, the contactor being movable between a first position in which electrical continuity between the center-tap of the battery and the neutral-point of the winding via the capacitor is established and a second position in which electrical discontinuity between the center-tap of the battery and the neutral-point of the winding is established; and a controller configured to operate the first power switch in a zero-current-switching mode while the contactor is in the first position to thereby achieve a target temperature of the battery and the winding; and wherein the capacitor and the winding form an LC circuit, and the controller is configured to operate the first power switch in the zero-current-switching mode by operating the first power switch at a switching frequency dependent on a resonant frequency of the LC circuit.

2. The system of claim 1 wherein:
the switching frequency is dependent on the resonant frequency of the LC circuit according to the equation:

$$fsw = fresonant/(2*k)$$

where $f_{sw}$ is the switching frequency, $f_{resonant}$ is the resonant frequency of the LC circuit, and k is a positive integer.

3. The system of claim 1 wherein:
the inverter is further configured to drive the motor with electrical power from the battery, the electrical power being according to a configuration of a second power switch of the inverter; and the controller is further configured to operate the first power switch and the second power switch in the zero-current-switching mode by alternately switching one of the power switches ON while switching the other one of the power switches OFF.

4. The system of claim 3 wherein:
the controller in alternately switching the power switches ON and OFF alternately switches the power switches ON and OFF with a duty cycle of 50%.

5. The system of claim 4 wherein:
the switching frequency is dependent on the resonant frequency of the LC circuit according to the equation:

$$fsw = fresonant/(2*k)$$

where $f_{sw}$ is the switching frequency, $f_{resonant}$ is the resonant frequency of the LC circuit, and k is a positive integer.

6. The system of claim 1 wherein:
the controller is further configured to move the contactor to the first position while the target temperature of the battery and the winding is not achieved.

7. An electric drive system for a vehicle, the electric drive system comprising:
a traction battery;
a motor having a plurality of motor windings;
an inverter configured to drive the motor with electrical power from the traction battery, the electrical power being according to a configuration of an upper power switch and a lower power switch in a leg of the inverter;

a capacitor connecting a center-tap of the traction battery and a neutral-point of the motor windings together whereby the capacitor and the motor windings form an LC circuit;

a contactor connected in series with the capacitor between the center-tap of the traction battery and the neutral-point of the motor windings, the contactor being movable between a first position in which electrical continuity between the center-tap of the traction battery and the neutral-point of the motor windings via the capacitor is established and a second position in which electrical discontinuity between the center-tap of the traction battery and the neutral-point of the motor windings is established; and a controller configured to alternately switch one of the power switches ON while switching the other one of the power switches OFF at a switching frequency dependent on a resonant frequency of the LC circuit while the contactor is in the first position to thereby cause electrical current to circulate between the traction battery, the inverter, and the motor which heats the traction battery and the motor windings.

8. The electric drive system of claim 7 wherein:
the switching frequency is dependent on the resonant frequency of the LC circuit according to the equation:

$$fsw = fresonant/(2*k)$$

where $f_{sw}$ is the switching frequency, $f_{resonant}$ is the resonant frequency of the LC circuit, and k is a positive integer.

9. The electric drive system of claim 7 wherein:
the controller in alternately switching the power switches ON and OFF alternately switches the power switches ON and OFF with a duty cycle of 50%.

10. The electric drive system of claim 7 further comprising:
the controller is further configured to move the contactor to the first position while the vehicle is not being propelled by the motor and a target temperature of the traction battery and the motor windings is not achieved.

11. The electric drive system of claim 7 wherein:
the controller is further configured to move the contactor to the second position while the vehicle is to be propelled by the motor and to operate the power switches for the inverter to drive the motor with electrical power from the traction battery for the motor to propel the vehicle.

12. The electric drive system of claim 7 wherein:
the traction battery includes a first battery pack and a second battery pack; and
a cathode of the first battery pack and an anode of the second battery pack are connected together at the center-tap of the traction battery.

* * * * *